(12) United States Patent
Olch

(10) Patent No.: US 6,377,888 B1
(45) Date of Patent: Apr. 23, 2002

(54) SYSTEM FOR CONTROLLING MOVEMENT OF A VEHICLE

(75) Inventor: Ronald H. Olch, Van Nuys, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 09/541,259

(22) Filed: Apr. 3, 2000

(51) Int. Cl.[7] .............................. H04L 7/02; G08G 1/042
(52) U.S. Cl. .......................... 701/207; 701/23; 701/25; 180/167; 340/572.1
(58) Field of Search ............................. 701/23, 25, 26, 701/217, 221, 207, 200, 24, 205; 318/587, 687, 568.12; 180/167, 168, 169; 340/572.1, 10.42, 572.4

(56) References Cited

U.S. PATENT DOCUMENTS

| | | | |
|---|---|---|---|
| 1,885,023 A | 10/1932 | Dieckmann | 340/990 |
| 3,004,258 A | 10/1961 | Cohen et al. | 342/458 |
| 3,659,085 A | 4/1972 | Potter et al. | 235/150.2 |
| 3,697,941 A | 10/1972 | Christ | 340/23 |
| 3,757,290 A | 9/1973 | Ross et al. | 340/23 |
| 3,828,306 A | 8/1974 | Angeloni | 340/32 |
| 3,876,980 A | 4/1975 | Haemmig et al. | 340/146.1 |
| 3,922,678 A | 11/1975 | Frenkel | 343/112 R |
| 4,083,003 A | 4/1978 | Haemmig | 325/6 |
| 4,112,421 A | 9/1978 | Freeny, Jr. | 343/112 D |
| 4,209,787 A | 6/1980 | Freeny, Jr. | 343/112 R |
| 4,530,056 A * | 7/1985 | Mackinnon et al. | 364/424 |
| 4,656,406 A * | 4/1987 | Houskamp | 318/587 |
| 4,658,373 A | 4/1987 | Murakami et al. | 364/559 |
| 4,716,530 A * | 12/1987 | Ogawa et al. | 364/424 |
| 4,847,773 A | 7/1989 | van Helsdingen et al. | 364/443 |
| 4,864,313 A | 9/1989 | Konneker | 342/457 |
| 4,940,925 A | 7/1990 | Wand et al. | 318/587 |
| 5,111,401 A * | 5/1992 | Everett, Jr. et al. | 364/424.02 |
| 5,291,411 A | 3/1994 | Bianco | 364/449 |
| 5,483,455 A | 1/1996 | Lay et al. | 364/448 |
| 5,559,696 A * | 9/1996 | Borenstein | 364/424.02 |
| 5,644,139 A | 7/1997 | Allen et al. | 250/557 |
| 5,883,598 A | 3/1999 | Parl et al. | 342/457 |
| 5,887,268 A * | 3/1999 | Furukawa | 701/23 |
| 5,893,043 A | 4/1999 | Moehlenbrink et al. | 701/207 |
| 6,008,727 A * | 12/1999 | Want et al. | 340/572.1 |
| 6,049,745 A * | 4/2000 | Douglas et al. | 701/23 |
| 6,092,010 A * | 7/2000 | Alofs et al. | 701/23 |
| 6,122,573 A * | 9/2000 | Higashi et al. | 701/23 |

* cited by examiner

Primary Examiner—Tan Nguyen
Assistant Examiner—Dalena Tran
(74) Attorney, Agent, or Firm—Christie, Parker & Hale, LLP

(57) ABSTRACT

The present invention resides in a system (10) for controlling movement of a free-ranging vehicle (12) about a surface (14). The system enables the vehicle to begin its travel from starting points not known in advance and whose destination point, and thus route, can be changed during the course of travel. The system has at least two dual-axial sensors (20) mounted to the vehicle that provide continuous acceleration data (18), a plurality of tags (16) fixedly arranged about the surface that provide absolute location data (30); at least two tag readers mounted to the vehicle, each of which reads the absolute location data of the respective tags that the at least two tag readers pass over as the vehicle moves about the surface; and a computer (28) mounted to the vehicle that functions to receive the absolute location data and the acceleration data and provides corrected motion command signals (32) to a vehicle navigation system that controls the motion of the vehicle. Thus, the system can correct the vehicle motion command signals for errors caused by drift of the dual-axial inertial sensors based on the absolute position data.

23 Claims, 1 Drawing Sheet

SYSTEM FOR CONTROLLING MOVEMENT OF A VEHICLE

CROSS-REFERENCES TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to the field of navigation, and, more particularly, to a system for controlling movement of a free-ranging vehicle on a surface. Although the present invention is subject to a wide range of applications, it is especially suited for use in a vehicle-ride attraction of an entertainment park, and will be particularly described in that connection.

2. Description of the Related Art

Automatically guided vehicles require some method of determining their location so that they can achieve the position/time/velocity profile desired. Existing methods include the use of the Global Position System (GPS), differential radio triangulation, laser triangulation, wheel encoders, Inertial Navigation Systems (INS) and others. Each of these methods have deficiencies which either increase costs, limit performance, or inhibit the environment in which the vehicle system can be used.

In addition, the ride vehicles may move through an extremely varied environment which may include large vertical structures, other moving objects, as well as special effects and projections emitting light, heat, and electromagnetic fields which could interfere with position location systems which depend on line-of-sight paths between vehicles and wayside emitters or sensors. However, a well-controlled interface between the vehicle and the floor is usually available.

An example of a navigation system for use with a free-ranging vehicle is described in U.S. Pat. No. 4,847,773 to van Helsdingen et al. (van Helsdingen '773 patent). The van Helsdingen '773 patent discloses a navigation system for use with a free-ranging vehicle that utilizes a detector for reading passive markers embedded in a floor to determine the vehicle's position.

In particular, the van Helsdingen '773 patent discloses a grid of passive markers which are positioned on, or in, a floor surface having a certain layout, which provides a grid over which the vehicle can move. The vehicle includes wheels, a motor for driving the wheels, and a steering mechanism for the wheels. The navigation system of the vehicle includes detectors for detecting the passive markers as the vehicle passes over them. The passive markers provide intermittent marker detection signals. The detector irradiates the passive marker which returns a signal merely indicating the presence of the marker.

Further, a computer control unit is connected to the steering mechanism and the detectors. The computer control unit computes a planned path for the vehicle over the floor surface, from a known starting point to an arbitrary destination, based upon stored information regarding the layout and the grid. Thus the vehicle knows when to expect to travel over which particular grid element in advance. The progress along the pre-computed path is frequently checked when passing over markers and, if necessary, the actual path is adjusted to correct for deviations in the movement of the vehicle from the planned path.

Although suitable for some free-ranging vehicles where the vehicle's starting position is known and the path of the vehicle is preplanned point-to-point route, this navigation system is not suitable for free-ranging vehicles that begin their travel from unknown starting points and whose destination point, and thus route, can be changed during the course of travel.

A need therefore exists for a system for controlling movement of a free-ranging vehicle on a surface that enables the vehicle to begin its travel from starting points not known in advance and whose destination point, and thus route, can be changed during the course of travel.

BRIEF SUMMARY OF THE INVENTION

The present invention, which tends to address this need, resides in a system for controlling movement of a free-ranging vehicle on a surface. The system described herein provide advantages over known navigation systems in that it enables the vehicles to begin their travel from starting points not known in advance and whose destination point, and thus route, can be changed during the course of travel. It does so by utilizing an interface between the vehicle and the surface the vehicle traverses and correcting its course based on absolute position readings.

According to the present invention, the system corrects vehicle motion command signals for errors caused by drift of an onboard dual-axial inertial sensor based on the comparison of the absolute position and the absolute orientation of a vehicle and the estimated position and the estimated orientation of the vehicle. This can be accomplished by at least two dual-axial sensors, mounted to the vehicle, that provide continuous acceleration data; a plurality of tags, fixedly arranged about the surface, that provides absolute location data; at least two tag readers, mounted to the vehicle, each to read the absolute location data of the respective tags that the at least two tag readers pass over as the vehicle moves about the surface; and a computer, mounted to the vehicle, functioning to receive the absolute location data and the acceleration data, compare the absolute position and the absolute orientation to the estimated position and the estimated orientation; and a vehicle navigation system for controlling the motion of the vehicle based on the corrected motion command signals. Thus, the vehicle can begin its travel from starting points not known in advance and can change its route during the course of travel.

In accordance with one aspect of the present invention, the plurality of tags are arranged in a rectilinear grid of equally spaced rows and columns. This arrangement provides a cost-effective and easily installed tag grid.

In accordance with another aspect of the present invention, the plurality of tags are arranged in a grid of alternating off-spaced columns. The resulting array is such that the distance between tags is constant. This arrangement provide some advantage in that the distance the vehicle must move to encounter a new tag is constant regardless of direction.

In accordance with still another aspect of the present invention, the at least two tag readers and the plurality of tags are arranged such that only one tag is read by a single tag reader at a time. This feature allows the tag reader to uniquely distinguish a tag during reading.

In accordance with a further aspect of the present invention, the velocity and acceleration of the vehicle is computed based on successive readings of the absolute location data made by the at least two tag readers at different vehicle positions. Position, velocity and acceleration can be computed from both the absolute location data from the at least two tag readers and the acceleration data from the at least two dual-axis sensors. The acceleration-based sensors provide higher accuracy and resolution but only for a short time before measurement drift becomes excessive. The system computes a running average from the absolute location data that can be used alone in slower, lower resolution applications or used to correct the acceleration-based measurements. The combination of acceleration-based sensors and tag readers can provide continuous high accuracy and resolution position, velocity, and acceleration for the vehicle control system. Also, if the acceleration-based sensors fail or are otherwise unusable, the system may use the tag readers alone as a lower resolution backup.

In accordance with another aspect of the present invention, at least one tag is read by the array of tag readers when the vehicle is stopped. This can be accomplished by having a one of the at least two tag readers include an array of tag readers that overlap so that at least one tag is in range of the tag reader. Thus, a vehicle which moves in random paths with respect to tag geometry, or which must know its position without movement upon power up in any location, can obtain absolute position data.

In accordance with still another aspect of the present invention, upon vehicle startup, the vehicle makes a series of short moves until a one of the at least two tag readers reads the absolute location data of the respective tag that the one of the at least two tag readers passes over as the vehicle moves about the surface. In this way, an absolute starting position can be obtained. The movements can continue until two tag readers read their respective tags, thereby establishing the vehicle's orientation.

In accordance with a further aspect of the present invention, the plurality of tags are passive radio-frequency identification (RFID) tags and the at least two tag readers are RFID tag readers. These types of tags and readers are low cost, low maintenance, and highly reliable. Moreover, their close proximity and 13.56 megahertz frequency minimize interference from other sources of energy, and the tags are simply installed by typical building contractors.

In accordance with another aspect of the present invention, the absolute location data is a unique code assigned to each tag. The computer stores a table juxtaposing the unique codes and the absolute location of the tags about the surface and translates the read unique code into the absolute location of the respective tag. In this way, the installation of the tags is simplified.

In accordance with another aspect of the present invention, the absolute location data is an identification assigned to each tag representing the x-y coordinates of the absolute location of each tag. This serves to greatly simplify and reduce the computation time of the table look up step by the computer.

In accordance with still another aspect of the present invention, the at least two tag readers can write a signature of the vehicle and the plurality of tags are writeable tags. Thus, the vehicle can leave a signature of itself on the plurality of tags that the at least two tag readers pass over as the vehicle moves about the surface. This has the advantage that a vehicle can mark its territory in a game playing situation.

Other features and advantages of the present invention will be set forth in part in the description which follows and accompanying drawings, wherein the preferred embodiments of the present invention are described and shown, and in part become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

DESCRIPTION OF THE PREFERRED EMBODIMENTS

Figure 1:
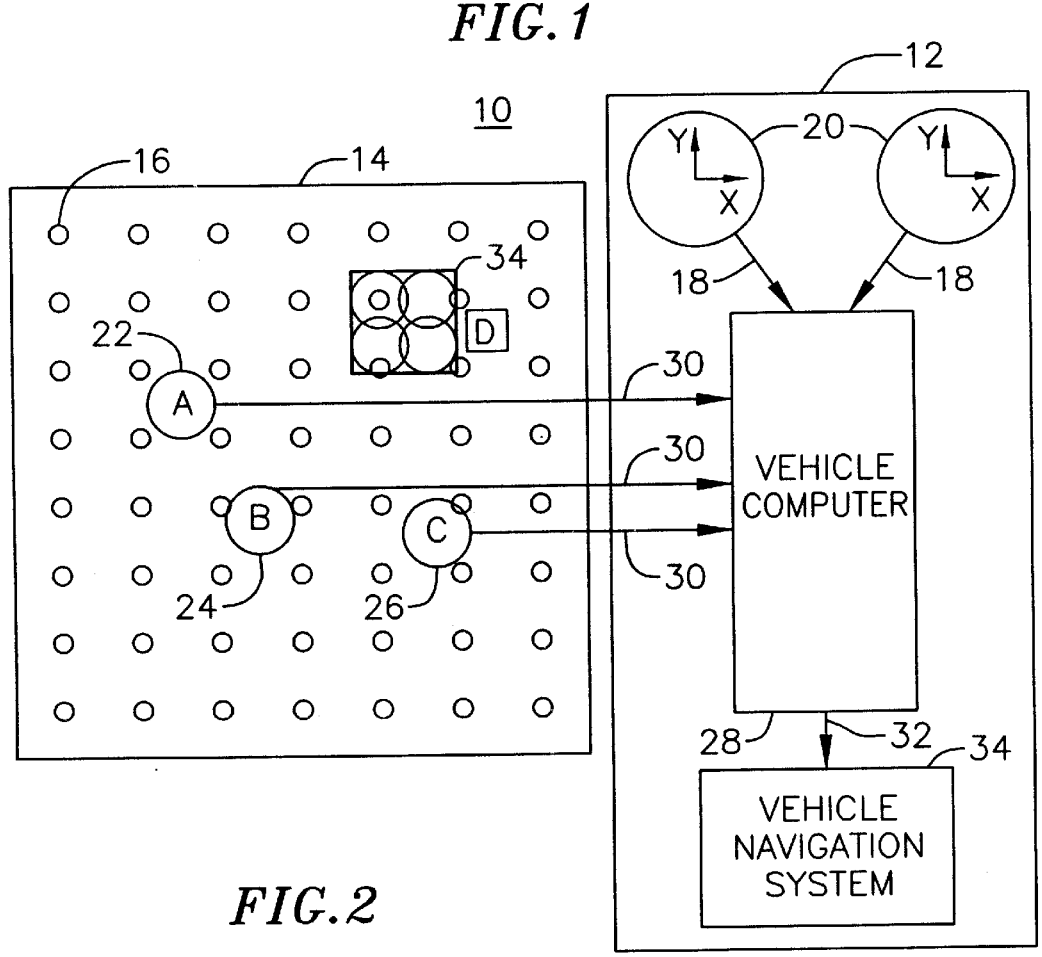
FIG. 1 is a simplified block diagram of an embodiment of a system for controlling movement of a free-ranging vehicle configured according to the present invention, particularly illustrating an arrangement of tags in a rectilinear grid of equally spaced columns and rows.

As shown in the exemplary drawings, and with particular reference to FIG. 1, the present invention is embodied in a system 10 for controlling movement of a free-ranging vehicle 12 on a surface 14, such as, a vehicle-ride attraction of an entertainment park. The system is adaptable to both wheeled vehicles and floating vehicles, such as, boats.

The system 10 comprises a a plurality of tags 16 that are fixedly arranged about the surface 14. The tags provide absolute location data. As shown in FIG. 1, the tags can be arranged in a rectilinear grid of equally spaced rows and columns.

Further, at least two tag readers are mounted to the vehicle 12, typically under the vehicle. For clarity, the vehicle in the simplified block diagram of FIG. 1 shows the vehicle to the side of the surface 14 and the tag readers are not shown. The distance from the tag readers to the tags 16 is typically several inches with little variation due to the known size of vehicle wheels. Tag to tag reader read distance is large enough such that a margin can be provided in the mounting of the tag readers above the surface so that read operations would typically not be affected by normal wheel wear of wheeled vehicles. As the vehicle moves about the surface, the tag readers pass over the tags and read the absolute location data 30 from the respective tag that the tag reader passes over.

Items referenced by numerals 22, 24, and 26 represent possible readable spans of coverage by a tag reader in three possible positions relative to the tags 16. As shown in FIG. 1, reader C can read a tag because its span is within the read range of a tag. That is, the span of the reader overlaps that of the tag. To uniquely distinguish a tag during reading, the geometry of the tags and tag readers can be arranged such that only one tag is visible to a reader at any time. That is, a span can be of a size with respect to the tag spacing such that it can be placed so that it will not read any tags.

The absolute location data 30 is used to compute the absolute location of the vehicle 12. When the vehicle is in position such that two tag readers pass over a tag, then absolute orientation of the vehicle can be computed as well from knowledge of the locations of the tags and the location of the tag readers mounted on the vehicle. Furthermore, the vehicle's velocity and acceleration can also be derived from a succession of absolute positions.

Also, at least two dual-axial sensors 20, such as, Summit Instruments model number 23203A dual-axis accelerometers, are mounted to the vehicle 12. The accelerometers provide continuous acceleration data 18. Using well known techniques, the acceleration data from each axis is integrated once to derive velocity and twice to obtain position for that axis. These values are used in a vector calculation to determine the position, velocity, acceleration, and direction or orientation of the vehicle.

In general, the type of accelerometer used should be capable of DC acceleration measurements, from 0 to the maximum acceleration the vehicle is capable of. Typically, this would be a Micromachined ElectroMechanical System (MEMS) integrated device.

In the preferred embodiment, two dual-axial sensors are mounted with identical orientations. That is, their x axis and y axis are parallel to each other. Two sets of sensors are preferred so that the vehicle's angular orientation about its center and rate of rotation can be calculated. The sensors are preferably placed as far apart on the vehicle as is practical. The farther apart the sensors, the more accurate the orientation and rate of rotation can be calculated.

Thus, the system 10 allows the vehicle 12 to periodically determine its absolute position and absolute orientation with respect to the surface 14. This information provides an absolute initial reference and is used to correct for drift in accelerometer measurements. The system combines the periodic absolute location data 30 from the array of tags 16 with continuous acceleration data 18 from the sensor 20 to provide accurate position estimation for onboard vehicle control loops. Onboard vehicle control loops refer to algorithms used by an onboard computer with input from the sensors and tag readers and output to the motor controllers. Estimated position and velocity derived from the sensors are differenced from the desired position and/or velocity to derive changes to motor torque or speed commands with the result that the vehicle moves in the desired direction and speed as accurately as possible.

The system 10 further comprises a computer 28 mounted to the vehicle 12. The computer receives the absolute location data 30 and the acceleration data 18. The computer computes the absolute position and the absolute orientation of the vehicle from the absolute location data, and computes the estimated position and the estimated orientation of the vehicle based on the acceleration data. The computer also compares the absolute position and the absolute orientation to the estimated position and the estimated orientation, and corrects motion command signals for errors caused by drift of the dual-axial inertial sensors based on the comparison of the positions and the orientations. The corrected motion command signals 32 are provided to an onboard vehicle navigation system 34 that controls the motion of the vehicle based on the corrected motion command signals using well-known techniques.

Due to the potentially large number of tags, they should be of low cost, low maintenance and high reliability. Interference from other sources of energy should be minimized and the tags should be able to be installed in a simple fashion by typical building contractors. While it is not a fundamental requirement of this invention, the best tags to meet these requirements today are passive radio-frequency identification (RFID) tags and corresponding RFID tag readers that operate at a frequency of about 13.56 megahertz. They typically are constructed of a single integrated circuit mounted in chip-on-board fashion on a thin piece of fiberglass circuit board which is etched to form the receiving/transmitting antenna. The tags can be model number ARIO 10-LM and the antenna can be model number Medio A-MA feeding a Medio C-P11 coupler, which are available from Gemplus Corporation. The tags can then be potted or laminated individually for installation at measured grid locations on a floor. They can then be covered by the final top coat or floor surface. The read distance varies by the antenna and tag sizes but is typically about four inches for one-inch tags and a six-inch diameter tag reader antenna. This distance provides a good margin for typical applications where the tags are up to one inch below the surface and the antenna is up to two inches above the surface of the floor.

Each tag chip can be manufactured with a unique (e.g., 40-bit) code which is transmitted to the tag reader. For simplicity of installation, tags with arbitrary identifications (IDs) can be placed in the floor grid. Prior to first use, the floor is read manually by a reader and computer which stores the IDs in the order read, e.g., row by row of the grid. After all tags are thus read, the computer sorts the IDs in ascending order, assigns the known floor grid x-y coordinates to each tag and writes a file which is a table of sorted IDs versus coordinates. This file is subsequently used by the vehicle computer to translate arbitrarily read tag IDs to absolute floor locations. An alternative method is to implant writeable tags in the floor and then manually set each one with an ID which directly encodes its x-y coordinates, eliminating table lookup in the vehicle computer.

Depending on the configuration of tags and readers, there may be vehicle positions such that one or neither reader will read a tag, in which case the computer cannot update the absolute vehicle position and the absolute orientation. This may not be a problem for vehicles which navigate to desired locations by following rows and columns of tags. However, for vehicles which must move in paths which are random with respect to tag geometry or which must know their position without movement upon power up in any location, it is desirable to read a tag. This can be solved in a number of ways depending on the system startup procedure and navigation algorithm employed.

One method uses an array of readers in place of each single reader, or a single swept reader, such as reader D 34 shown in FIG. 1. The reader array spans logically overlap so that at least one tag is in the span of the tag reader array when the vehicle is stopped. The position of the vehicle is estimated by taking into account an offset based on which tag reader of the tag reader array read the tag. Because readers may interfere with each other if actually placed in such an overlapping fashion, the actual location of the readers should be a relative spacing of a multiple of the tag grid spacing. This method of arraying antennas requires at least 8 readers per vehicle.

A lower cost way to achieve the same result is to use a single antenna/reader that oscillates its position with respect to the vehicle such that it sweeps out an overlapping read area equivalent to that of a much larger antenna. The computer is provided with tag read data as well as the position of the antenna motion mechanism at the time the tag was read, thus compensating for this motion and resulting in an accurate estimate of vehicle position.

In another method to solve the problem when the vehicle is in a position such that one or neither reader will read a tag upon startup, the vehicle can make a series of short moves until a tag reader encounters a tag, thereby establishing an absolute starting position. The movements can continue until two tag readers read their respective tags, thereby establishing the vehicle's orientation.

In still another method, the tags and readers can be of a type that can allow a reader to read more than one tag within the reader's read range. For example, this can be accomplished by random time intervals between tag responses to signals from the antenna such that, eventually, the antenna/reader distinguishes all tags in its read range. Thus, at least one and up to four tags can be read in any position of the antenna. The read tags can be used to more accurately compute antenna position. This method is suitable for slower vehicles due to the required longer read/resolve time.

Position resolution is a function of tag spacing, the number of readers arrayed in the vehicle, and algorithms computed onboard the vehicle which take into account the last known vehicle position and velocity to improve the estimated vehicle position beyond simple inter-tag spacing. For example, the positional resolution of the navigation system depends on the spacing of the tags which, in turn, determines the maximum antenna size (span). Table 1 represents the tradeoff between tag spacing and number of tags required for a given floor area. The number of tags in a given area increases as the inverse square of the tag spacing. The total number of tags in a square array is given by the following equation:

$$((12N/S+1)^2, \qquad (1)$$

where N is the length of a grid side in feet, N×N is the grid size in square feet, and S is the tag spacing in inches.

TABLE 1

| Grid Size, | Total Number of Tags | | |
|---|---|---|---|
| | Tag Spacing, S (inches) | | |
| $N^2$ (feet$^2$) | 1 | 5 | 10 |
| 100 | 14,641 | 625 | 169 |
| 2500 | 361,201 | 14,641 | 3,721 |
| 10,000 | 1,442,401 | 58,801 | 14,641 |

Thus, the number of tags and corresponding tag and installation costs are influenced by tag spacing. Wider tag spacings may still provide good resolution by the method of tag reader arrays or sweeping antennas, as discussed above.

Another system design issue is the maximum velocity at which a vehicle may be traveling and still reliably read tags. This speed is a function of the distance between the tags and antennas, the time from when a tag is illuminated with an RF signal from the antenna to when it starts to transmit data, and the resulting data bit rate. Table 2 represents the maximum vehicle speeds versus antenna span. As the span increases, read time increases for a given vehicle speed. However, increased span results in lower positional resolution. This means that improvements in RFID tag read speeds results in the potential for higher resolution navigation systems.

TABLE 2

| | Time Available to Read a Tag (milliseconds) | | | |
|---|---|---|---|---|
| | Vehicle Speed (feet-per-second) | | | |
| Span (inches) | 1 | 5 | 10 | 90 |
| 1 | 83.33 | 16.67 | 8.33 | 0.93 |
| 5 | 416.67 | 83.33 | 41.67 | 4.63 |
| 10 | 833.333 | 166.67 | 83.33 | 9.26 |

The vehicle's orientation or heading correction value is found by using at least two tag readers. The absolute position data of both readers and the known mounting position of the readers on the vehicle are used to calculate the orientation of the vehicle with respect to the tag coordinates. The accuracy of the orientation calculation depends on the accuracy in reading the absolute position and the distance between the tag readers. Table 3 represents the worst case angular deviations from true heading given various spans and antenna separations.

TABLE 3

| | Worst Case Angular Deviation (degrees) | | |
|---|---|---|---|
| | Span (inches) | | |
| Reader Separation (inches) | 1 | 5 | 8 |
| 3 | 18.43 | 59.04 | 69.44 |
| 12 | 4.76 | 22.62 | 33.69 |
| 60 | 0.95 | 4.76 | 7.59 |

The present invention is capable of other and different embodiments, and its several details are capable of modification. Where appropriate the same reference numerals are used to avoid unnecessary duplication and description of similar elements already referred to and described above. Only the significant differences of the second embodiment as compared to the first embodiment will be discussed hereafter.

Figure 2:
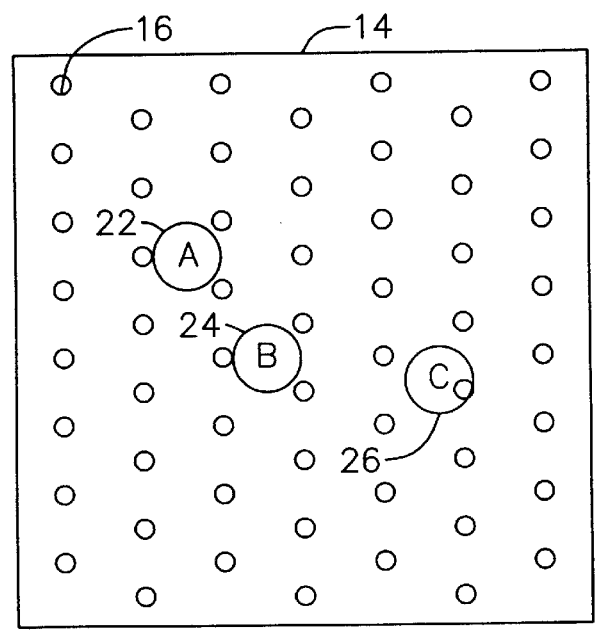
FIG. 2 is a simplified block diagram of an embodiment of an arrangement of tags in a grid of alternating off-spaced columns.

For example, a variation of the rectangular tag grid spacing may provide some benefit in accurately estimating vehicle position. As shown in the embodiment illustrated in FIG. 2, the tags can be arranged in a hexagonal grid pattern. The hexagonal tag grid pattern can be created by spacing alternating columns of tags 0.866× vertical tag spacing with the vertical position of tags half way between those of the alternate columns. The resulting array is such that the distance between tags is constant, slightly larger than the sum of a tag and a tag reader span. This may provide some advantage in that the distance the vehicle must move to encounter a new tag is constant regardless of direction. This small difference from the characteristics of a square grid are offset by the added complexity of accurately placing the hexagonally grid tags in a floor and the larger number of such tags for a given floor area (about 15%).

Further, increasing tag read speeds will allow increased vehicle speed. For example, read speeds down to about 10 milliseconds would increase maximum vehicle speed to about 40 feet-per-second. Further, with the scanning reader antenna concept, with a faster moving antenna it may be possible to cover a larger area in a shorter time with a smaller antenna which would result in greater accuracy of positional measurements.

Also, tag readers with multiplexed inputs can be used. For example, one reader can use multiple antennas. This can produce possible cost savings as long as the total read time is small enough without excessive time skew between readings.

Another embodiment is to have tag readers that can write a signature of the vehicle to the tags that the tag readers pass over as the vehicle moves about the surface. In this way, the vehicle can leave a "signature" of itself wherever it goes, which can be read by other vehicles that subsequently pass over the same area. This might be used, for instance, to mark territory in a game playing situation.

The scope of the claimed invention is intended to encompass evolving technology. For example, the field of MEMS integrated devices is rapidly evolving and will most likely produce the integration of rate gyros onto the same chips as the accelerometers. Up to three of each may all be on the same chip for a complete inertial management unit at a very low cost compared to the discrete devices available today.

Furthermore, a uniform pattern of tags is not an essential aspect of the invention. To save money or increase accuracy in critical regions, it is feasible to reduce or increase the number of tags in a given area provided the tag reader can distinguish one tag from another, typically by tag spacing that is slightly larger than the antenna span. Tags may also be placed in a single row when the vehicle is constrained to a straight line by programming or by a track. Tags may also be placed on any surface which may be passed by a vehicle such as the walls of a flume or on individual objects. In the latter case, the tag can tell the vehicle what kind of object it is as well as its position such that the vehicle might respond differently to one object or location than another. Tags may even be placed on other vehicles indicating proximity and unique identification.

Those skilled in the art will recognize that other modifications and variations can be made in the system for controlling motion of a vehicle of the present invention and in construction and operation of this system without departing from the scope or spirit of this invention.

What is claimed is:

1. A system for controlling movement of a free-ranging vehicle on a surface, the system comprising:
   a plurality of tags, fixedly arranged about the surface, to provide absolute location data;
   at least two tag readers, mounted to the vehicle, each to read the absolute location data of the respective tags that the at least two tag readers pass over as the vehicle moves about the surface;
   at least two dual-axial sensors, mounted to the vehicle, to provide continuous acceleration data;
   a computer, mounted to the vehicle, functioning to receive the absolute location data and the acceleration data, compute the absolute position and the absolute orientation of the vehicle from the absolute location data, compute the estimated position and the estimated orientation of the vehicle based on the acceleration data, compare the absolute position and the absolute orientation to the estimated position and the estimated orientation, correct motion command signals for errors caused by drift of the at least two dual-axial inertial sensors based on the comparison of the positions and the orientations, and provide the corrected motion command signals; and
   a vehicle navigation system for controlling the motion of the vehicle based on the corrected motion command signals.

2. The system of claim 1, wherein the plurality of tags are arranged in a rectilinear grid of equally spaced rows and columns.

3. The system of claim 1, wherein the plurality of tags are arranged in a grid of alternating off-spaced columns.

4. The system of claim 1, wherein the at least two tag readers and the plurality of tags are arranged such that only one tag is read by a single tag reader at a time.

5. The system of claim 1, wherein the at least two tag readers and the plurality of tags are arranged such that multiple tags can be read by a single reader at a time.

6. The system of claim 1, wherein the computer further functions to compute the velocity and acceleration of the vehicle based on successive readings of the absolute location data made by the at least two tag readers at different vehicle positions.

7. The system of claim 1, wherein a one of the at least two tag readers includes an array of tag readers, the array of tag readers and the plurality of tags are arranged such that at least one tag is read by the array of tag readers when the vehicle is stopped.

8. The system of claim 1, wherein, upon vehicle startup, the computer provides an initial motion command signal instructing the vehicle to make a series of short moves until each of the at least two tag readers read the absolute location data of the respective tags that the at least two tag readers pass over as the vehicle moves about the surface.

9. The system of claim 1, wherein the plurality of tags are passive radio-frequency identification (RFID) tags and the at least two tag readers are RFID tag readers.

10. The system of claim 1, wherein the absolute location data is a unique code assigned to each tag, wherein the computer stores a table juxtaposing the unique codes and the absolute location of the tags about the surface and translates the read unique code into the absolute location of the respective tag.

11. The system of claim 1, wherein the absolute location data is an identification assigned to each tag representing the x-y coordinates of the absolute location of each tag.

12. The system of claim 1, wherein the dual-axial sensors are laterally spaced apart with respect to the surface.

13. A system for controlling movement of a free-ranging vehicle on a surface, the system comprising:
   a plurality of tags, fixedly arranged about the surface, to provide absolute location data;
   at least two tag readers, mounted to the vehicle, each to read the absolute location data of the respective tags that the at least two tag readers pass over as the vehicle moves about the surface, a one of the at least two tag readers includes a tag reader with an antenna that oscillates its position with respect to the vehicle such that it sweeps out an overlapping read area equivalent to that of a much larger antenna, wherein the tag reader and the plurality reader when the vehicle is stopped;
   at least two dual-axial sensors, mounted to the vehicle, to provide continuous acceleration data;
   a computer, mounted to the vehicle, functioning to receive the absolute location data and the acceleration data, compute the absolute position and the absolute orientation of the vehicle from the absolute location data, compute the estimated position and the estimated orientation of the vehicle based on the acceleration data, compare the absolute position and the absolute orientation to the estimated position and the estimated orientation, correct motion command signals for errors caused by drift of the at least two dual-axial inertial sensors based on the comparison of the positions and the orientations, and provide the corrected motion command signals, the computer is provided the position of the antenna with respect to the vehicle at the time the tag was read and compensates for the antenna position in computing the absolute position and the absolute orientation of the vehicle from the absolute location data; and
   a vehicle navigation system for controlling the motion of the vehicle based on the corrected motion command signals.

14. A system for controlling movement of a free-ranging vehicle on a surface, the system comprising:
   a plurality of tags, fixedly arranged about the surface, to provide absolute location data;
   at least two tag readers, mounted to the vehicle, each to read the absolute location data of the respective tags that the at least two tag readers pass over as the vehicle moves about the surface, wherein the at least two tag readers can write a signature of the vehicle and the plurality of tags are writeable tags, wherein the vehicle can leave a signature of itself on the plurality of tags that the at least two tag readers pass over as the vehicle moves about the surface;

at least two dual-axial sensors, mounted to the vehicle, to provide continuous acceleration data;

a computer, mounted to the vehicle, functioning to receive the absolute location data and the acceleration data, compute the absolute position and the absolute orientation of the vehicle from the absolute location data, compute the estimated position and the estimated orientation of the vehicle based on the acceleration data, compare the absolute position and the absolute orientation to the estimated position and the estimated orientation, correct motion command signals for errors caused by drift of the at least two dual-axial inertial sensors based on the comparison of the positions and the orientations, and provide the corrected motion command signals; and a vehicle navigation system for controlling the motion of the vehicle based on the corrected motion command signals.

15. A system for controlling movement of a free-ranging vehicle on a surface, the system comprising:

a plurality of passive radio-frequency identification (RFID) tags, fixedly arranged in a rectilinear grid of equally spaced rows and columns about the surface, to provide absolute location data;

two RFID tag readers, mounted to the vehicle, each to read the absolute location data of the respective RFID tags that the two RFID tag readers pass over as the vehicle moves about the surface, wherein the plurality of passive RFID tags are arranged such that only one passive RFID tag is read by a single RFID tag reader at a time;

two dual-axial accelerometers, mounted to the vehicle, to provide continuous acceleration data;

a computer, mounted to the vehicle, functioning to receive the absolute location data and the acceleration data, compute the absolute position and the absolute orientation of the vehicle from the absolute location data, compute the estimated position and the estimated orientation of the vehicle based on the acceleration data, compare the absolute position and the absolute orientation to the estimated position and the estimated orientation, correct motion command signals for errors caused by drift of the two dual-axial accelerometers based on the comparison of the positions and the orientations, and provide corrected motion command signals; and a vehicle navigation system for controlling the motion of the vehicle based on the corrected motion command signals.

16. The system of claim 15, wherein the computer further functions to compute the velocity and acceleration of the vehicle based on successive readings of the absolute location data made by the two RFID tag readers at different vehicle positions.

17. The system of claim 15, wherein a one of the two RFID tag readers includes an array of RFID tag readers, the array of RFID tag readers and the plurality of passive RFID tags are arranged such that at least one passive RFID tag is read by the array of RFID tag readers when the vehicle is stopped.

18. The system of claim 15, wherein, upon vehicle startup, the computer provides an initial motion command signal instructing the vehicle navigation system to make a series of short moves until each of the RFID tag readers read the absolute location data of the respective passive RFID tags that the two RFID tag readers pass over as the vehicle moves about the surface.

19. The system of claim 15, wherein the absolute location data is a unique code assigned to each passive RFID tag, wherein the computer stores a table juxtaposing the unique codes and the absolute location of the passive RFID tags about the surface and translates the read unique code into absolute location of the respective passive RFID tag.

20. The system of claim 15, wherein the absolute location data is an identification assigned to each passive RFID tag representing the x-y coordinates of the absolute location of each passive RFID tag.

21. The system of claim 15, wherein the dual-axial accelerometers are laterally spaced apart with respect to the surface.

22. A system for controlling movement of a free-ranging vehicle on a surface, the system comprising:

a plurality of passive radio-frequency identification (RFID) tags, fixedly arranged in a rectilinear grid of equally spaced rows and columns about the surface, to provide absolute location data;

two RFID tag readers, mounted to the vehicle, each to read the absolute location data of the respective RFID tags that the two RFID tag readers pass over as the vehicle moves about the surface, wherein the plurality of passive RFID tags are arranged such that only one passive RFID tag is read by a single RFID tag reader at a time, a one of the two RFID tag readers includes an RFID tag reader with an antenna that oscillates its position with respect to the vehicle such that it sweeps out an overlapping read area equivalent to that of a much larger antenna, wherein th RFID tag reader and the plurality of passive RFID tags are arranged such that at least one passive RFID tag is read by the RFID tag reader when the vehicle is stopped;

two dual-axial accelerometers, mounted to the vehicle, to provide continuous acceleration data;

a computer, mounted to the vehicle, functioning to receive the absolute data and the acceleration data, compute the absolute position and the absolute orientation of the vehicle from the absolute location data, compute the estimated position and the estimated orientation of the vehicle based on the acceleration data, compare the absolute position and the absolute orientation to the estimated position and the estimated orientation, correct motion command signals for errors caused by drift of the two dual-axial accelerometers based on the comparison of the positions and the orientations, and provide corrected motion command signals, the computer is provided the position of the antenna with respect to the vehicle at the time the passive RFID tag was read and compensates for the antenna position in computing the absolute position and the absolute orientation of the vehicle from the absolute location data; and a vehicle navigation system for controlling the motion of the vehicle based on the corrected motion command signals.

23. A system for controlling movement of a free-ranging vehicle on a surface, the system comprising:

a plurality of passive radio-frequency identification (RFID) tags, fixedly arranged in a rectilinear grid of equally spaced rows and columns about the surface, to provide absolute location data;

two RFID tag readers, mounted to the vehicle, each to read the absolute location data of the respective RFID tags that the two RFID tag readers pass over as the vehicle moves about the surface, wherein the plurality of passive RFID tags are arranged such that only one passive RFID tag is read by a single RFID tag reader at a time, wherein the two RFID tag readers can write a signature of the vehicle and the plurality of passive RFID tags are writeable tags, wherein the vehicle can leave a signature of itself on the plurality of passive RFID tags that the two RFID tag readers pass over as the vehicle moves about the surface;

two dual-axial accelerometers, mounted to the vehicle, to provide continuous acceleration data;

a computer, mounted to the vehicle, functioning to receive the absolute location data and the acceleration data, compute the absolute position and the absolute orientation of the vehicle from the absolute location data, compute the estimated position and the estimated orientation of the vehicle based on the acceleration data, compare the absolute position and the absolute orientation to the estimated position and the estimated orientation, correct motion command signals for errors caused by drift of the two dual-axial accelerometers based on the comparison of the positions and the orientations, and provide corrected motion command signals; and a vehicle navigation system for controlling the motion of the vehicle based on the corrected motion command signals.

\* \* \* \* \*